United States Patent
Hessler (10) Patent No.: US 9,763,384 B2
(45) Date of Patent: Sep. 19, 2017

(54) MOTOR CONTROL SYSTEM AND METHOD FOR AGRICULTURAL SPREADER

(75) Inventor: Charles Andrew Hessler, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 1010 days.

(21) Appl. No.: 13/619,341

(22) Filed: Sep. 14, 2012

(65) Prior Publication Data

US 2014/0076981 A1    Mar. 20, 2014

(51) Int. Cl.
| | | |
|---|---|---|
| *A01D 41/12* | (2006.01) | |
| *A01D 69/03* | (2006.01) | |
| *F16H 61/452* | (2010.01) | |
| *A01D 41/127* | (2006.01) | |

(52) U.S. Cl.
CPC ..... *A01D 41/1243* (2013.01); *A01D 41/1274* (2013.01); *A01D 69/03* (2013.01); *F16H 61/452* (2013.01)

(58) Field of Classification Search
CPC .............. A01D 41/1243; A01D 41/127; A01D 41/1274; A01D 69/03; E01C 19/203; A01C 3/06; A01C 3/066; F16H 61/452; Y10S 460/901
USPC .............. 239/7, 673, 677, 680–682; 60/424; 460/111; 56/10.9; 701/50
See application file for complete search history.

(56) References Cited

U.S. PATENT DOCUMENTS

| | | | | |
|---|---|---|---|---|
| 3,073,123 A | * | 1/1963 | Hodgson | ................. F16H 61/40 60/424 |
| 3,776,431 A | * | 12/1973 | Riley | ...................... F16H 61/46 222/627 |
| 3,790,090 A | * | 2/1974 | Lorenc | .................... B60B 39/04 239/666 |
| 3,904,129 A | * | 9/1975 | Lorenc | ................. A01C 17/006 137/48 |
| 4,129,258 A | | 12/1978 | Mott et al. | |
| 4,383,536 A | | 5/1983 | Delorme | |
| 4,442,979 A | * | 4/1984 | Kupper | ................. E01C 19/203 239/656 |
| 4,617,942 A | | 10/1986 | Garner | |
| 4,684,068 A | | 8/1987 | Busboom | |
| 4,842,202 A | | 6/1989 | van der Lely et al. | |

(Continued)

FOREIGN PATENT DOCUMENTS

| | | |
|---|---|---|
| EP | 0212337 B1 | 4/1990 |
| EP | 788731 | 8/1997 |
| GB | 2057837 | 4/1981 |

*Primary Examiner* — Darren W Gorman
(74) *Attorney, Agent, or Firm* — Patrick M. Sheldrake (57) ABSTRACT

An agricultural spreader system includes a first motor, a second motor, and a valve system coupled to the first motor and to the second motor. The first motor is configured to be driven by a working fluid and to drive a first spreader disc in rotation. The second motor is configured to be driven by the working fluid and to drive a second spreader disc in rotation. The valve system is configured to transition between a series flow arrangement and a parallel flow arrangement. The series flow arrangement is configured to direct the working fluid to the second motor through the first motor. The parallel flow arrangement is configured to direct a first portion of the working fluid to the first motor, and to direct a second portion of the working fluid to the second motor.

20 Claims, 4 Drawing Sheets

(56) References Cited

U.S. PATENT DOCUMENTS

| | | | |
|---|---|---|---|
| 5,082,186 A | 1/1992 | Bruns | |
| 5,797,793 A | 8/1998 | Matousek et al. | |
| 7,306,174 B2 | 12/2007 | Pearson et al. | |
| 7,487,024 B2 | 2/2009 | Farley et al. | |
| 2005/0067515 A1* | 3/2005 | Neier | A01C 3/066 239/669 |
| 2008/0296083 A1* | 12/2008 | Krieger | F15B 11/17 180/403 |
| 2009/0005939 A1 | 1/2009 | Dueckinghaus et al. | |
| 2009/0287380 A1 | 11/2009 | Chervenka et al. | |
| 2010/0010713 A1 | 1/2010 | Sheidler et al. | |
| 2011/0067391 A1* | 3/2011 | Harms | E01H 10/007 60/420 |
| 2011/0107734 A1 | 5/2011 | Giotto et al. | |
| 2011/0303312 A1* | 12/2011 | Owenby | F17D 3/00 137/625 |

* cited by examiner

MOTOR CONTROL SYSTEM AND METHOD FOR AGRICULTURAL SPREADER

BACKGROUND

The invention relates generally to agricultural equipment, such as harvesters, and more specifically, to a motor control system and method for an agricultural spreader.

A harvester may be used to harvest agricultural crops, such as barley, beans, beets, carrots, corn, cotton, flax, oats, potatoes, rye, soybeans, wheat, or other plant crops. Moreover, a combine (e.g., combine harvester) is a specific type of harvester generally used to harvest grains (e.g., barley, corn, flax, oats, rye, rice, soybeans, wheat, etc.). Accordingly, a combine may be used to separate a plant into different agricultural materials, such as grain, chaff, and straw. The combine begins the harvesting process by removing the plant from the ground, usually using a cutting device (i.e., a header). The combine then moves the plant from the cutting device into the combine with a feeder system. Inside the combine, the plant undergoes processes that separate it into agricultural materials. Some of these agricultural materials (e.g., straw, chaff) may be discharged from the combine onto the recently harvested field. The combine may spread the agricultural materials with a spreader system. Hydraulic motors may drive spreader discs or fans to rotate, thereby distributing the agricultural material behind the combine. Unfortunately, changes in the consistency and/or density of the agricultural materials flowing to the spreader discs may cause agricultural material to build up and stall the spreader system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an agricultural spreader system includes a first motor, a second motor, and a valve system coupled to the first motor and to the second motor. The first motor is configured to be driven by a working fluid and to drive a first spreader disc in rotation. The second motor is configured to be driven by the working fluid and to drive a second spreader disc in rotation. The valve system is configured to transition between a series flow arrangement and a parallel flow arrangement. The series flow arrangement is configured to direct the working fluid to the second motor through the first motor. The parallel flow arrangement is configured to direct a first portion of the working fluid to the first motor, and to direct a second portion of the working fluid to the second motor.

In another embodiment, an agricultural spreader system includes a first hydraulic motor configured to drive a first spreader disc, a second hydraulic motor configured to drive a second spreader disc, and a controller. The controller is configured to control a first torque independently of the first hydraulic motor and a second torque of the second hydraulic motor. The controller is configured to control the first torque and the second torque to a low torque for normal operation. The controller is also configured to control the first torque to a first high torque for clearing a material from the first spreader disc, and the controller is configured to control the second torque to a second high torque for clearing the material from the second spreader disc.

In another embodiment, a method for using an agricultural spreader includes supplying a hydraulic fluid to a first hydraulic motor and to a second hydraulic motor, and adjusting a first torque and a second torque. The first hydraulic motor is configured to rotate a first spreader disc with the first torque, and the second hydraulic motor is configured to rotate a second spreader disc with the second torque. The first and second spreader discs are configured to spread agricultural material. Adjusting the first torque and the second torque includes switching the first hydraulic motor and the second hydraulic motor between at least a high torque mode and a low torque mode.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
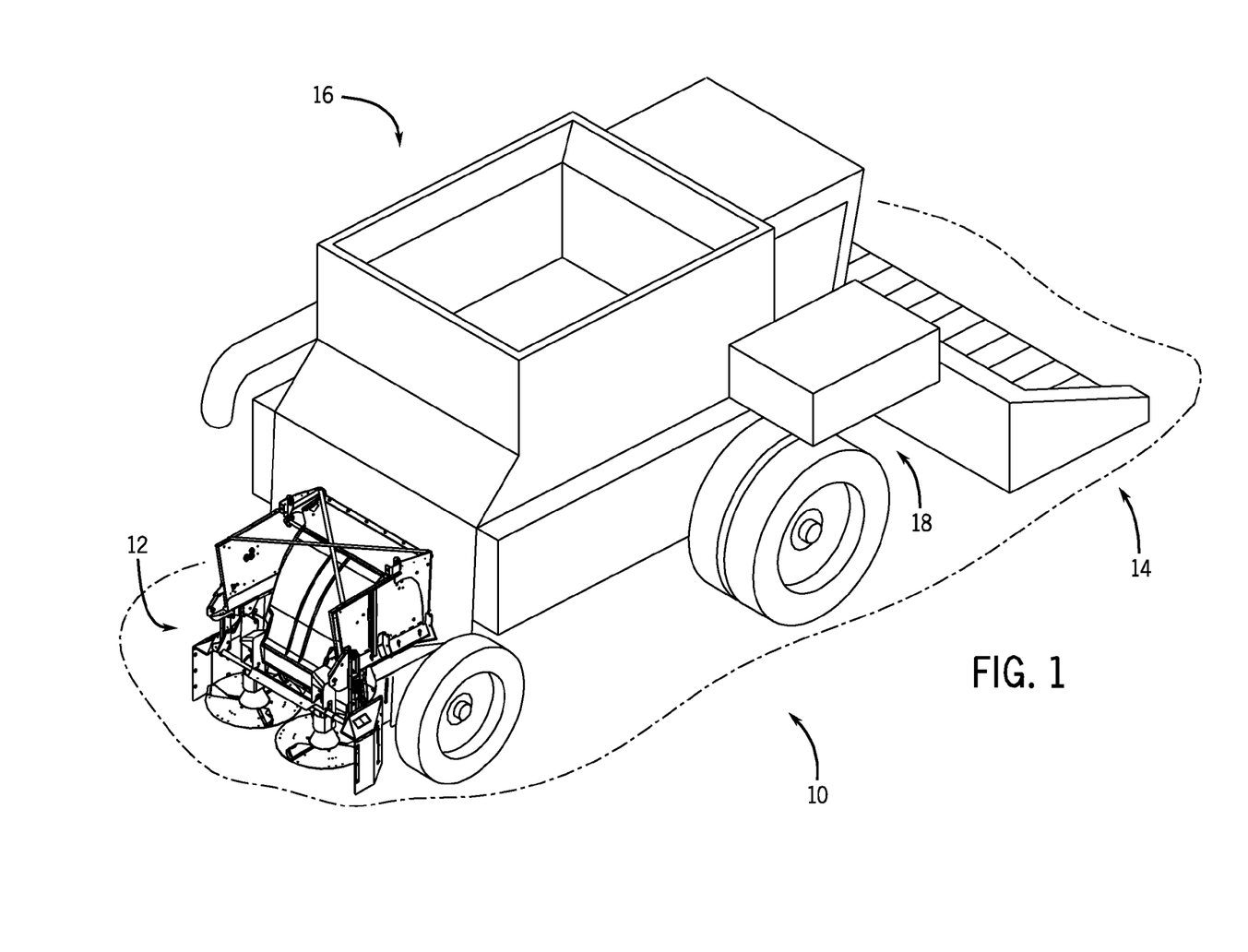
FIG. 1 is a rear perspective view of an embodiment of a harvester with a spreader system.

Turning now to the drawings, FIG. 1 is a rear perspective view of an embodiment of a harvester 10 with a spreader system 12. The harvester 10 may harvest grains such as barley, corn, flax, oats, rye, rice, soybeans, wheat, and so forth. Accordingly, the harvester 10 is configured to remove plants from the ground, and to separate the plants into different agricultural materials (e.g., grain, straw, and chaff). As discussed above, the harvester discharges this material after processing it. Some of the agricultural materials may exit the rear of the harvester into the spreader system 12. For example, the spreader system 12 may direct straw and chaff into contact with spreader discs. The spreader discs may evenly spread the chaff over the field behind the harvester. As discussed in detail below, the speed of the spreader discs may be controlled independently to control the distribution of the chaff behind the harvester. The torque of the spreader discs may also be controlled independently to control the flow of chaff through the spreader system. The torque of the spreader discs may be adjusted to maintain the rotation of the spreader discs without stalling the spreader system due to varying densities of chaff.

The harvesting process begins with the harvester 10 using a cutting assembly 14 to remove plants from the soil. An operator of the harvester 10 may be seated in a cab 16, and may monitor the operation of the cutting assembly 14 and other systems of the harvester 10. After removing the plants, the harvester 10 transports the plants to a feeder assembly 18. The feeder assembly 18 moves the plants from the cutting assembly 14 into the harvester 10 for processing. Once inside the harvester 10, the plants undergo various processes that separate the plant into different agricultural materials (e.g., grain, chaff, straw). The different agricultural materials then exit the harvester 10 into the spreader system 12.

Figure 2:
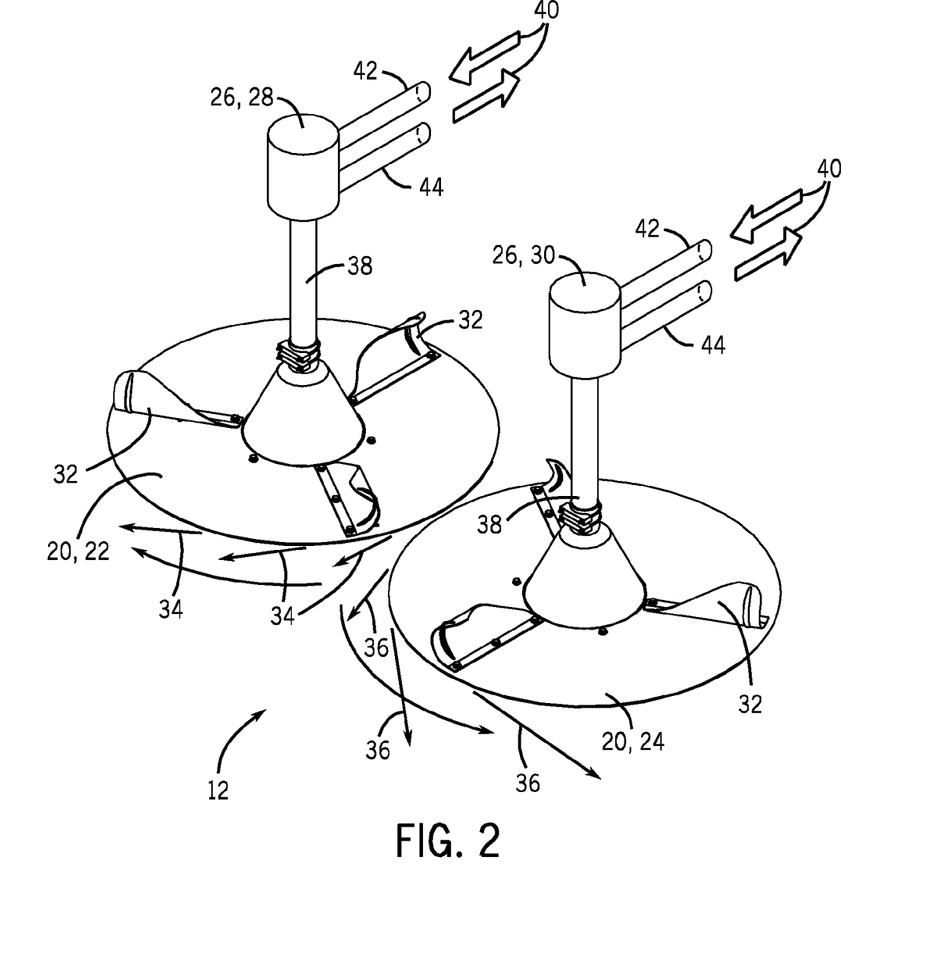
FIG. 2 is a perspective view of the spreader system of FIG. 1, with motors coupled to spreader discs.

FIG. 2 is a perspective view of the spreader system 12 with spreader discs 20 or fans configured to spread agricultural material. Presently contemplated embodiments of the spreader system 12 include a first spreader disc 22 and a second spreader disc 24, but other embodiments may include any number of spreader discs 20. Each spreader disc may be driven by a motor 26 (e.g., hydraulic motor). For example, a first motor 28 is coupled to the first spreader disc 22, and a second motor 30 is coupled to the second spreader disc 24. As explained above, the harvester 10 separates plants into different agricultural materials (e.g., grain, straw, and chaff). These materials are moved through the harvester 10 along different paths, exit the harvester, and are distributed throughout a field to decompose or to undergo additional processes. For example, wheat may be separated into grain, chaff, and straw as the wheat passes through the various processes in the harvester 10. The grain is collected for transport, while the chaff and straw exit the rear of the harvester 10 through the spreader system 12 onto the recently harvested field.

Each spreader disc 20 includes one or more paddles 32 configured to distribute the agricultural material throughout a field. As chaff falls onto the spinning spreader disc 20, the paddles 32 contact the chaff and induce the chaff to exit the spreader disc 20 in a tangential direction. The first spreader disc 22 rotates clockwise, while the second spreader disc 24 rotates counterclockwise. The rotational direction of the first and second spreader discs 22, 24 enables the spreader system to spread the agricultural material away from the harvester 10 in tangential directions 34 and 36. In operation, the spreader discs 20 may rotate at high speeds (e.g., 200-1200 RPM).

The spreader discs 20 are coupled to the motors 26 by shafts 38. The motors 26 receive a working fluid 40 (e.g., hydraulic fluid) that drives the motors 26 to rotate the shafts 38, which drive the spreader discs 20 to spread the agricultural material. The working fluid 40 enters each motor 26 through an inlet 42, drives the respective motor 26, and exits through an outlet 44. The pressure of the working fluid 40 decreases between the inlet 42 and the outlet 44 as it flows through the motor 26. As discussed in detail below, the pressure and/or the flow rate of the working fluid 40 may be adjusted according to various arrangements of a valve system. In some arrangements, the working fluid 40 may circulate from the first motor 28 to the second motor 30 in series, such that the pressure of the working fluid 40 at the inlet 42 of the first motor 28 is greater than the pressure of the working fluid 40 at the inlet 42 of the second motor 30. In some arrangements, the working fluid 40 may be divided into two or more portions that flow in parallel to the motors, such that the pressure of each portion directed to the first and second motors 28, 30 is substantially the same (e.g., pump pressure) at each inlet 42.

In some embodiments, the first and second motors 28, 30 may be controlled independently to enable the first spreader disc 22 to rotate at a different speed and torque than the second spreader disc 24. The pressure of the working fluid 40 at the first and second motors 28, 30 may affect the speed and torque. Independent control of the pressure of the working fluid 40 supplied to the first and second motors 28, 30 enables the spreader system 12 to control the speed and torque independently. The spreader system 12 described below may enable control of the speed and torque regardless of the load on the first and second spreader discs 22, 24. Independently varying the speed of the first and second spreader discs 22, 24 may enable the spreader system 12 to compensate for various environmental or operating conditions. Rotating the spreader discs 20 at high speeds (e.g., normal operation) may spread the agricultural material further than relatively low speeds (e.g., clearing agricultural material). For example, wind direction relative to the spreader system 12 may cause the agricultural material to be spread unevenly. Accordingly, the first motor 28 may be controlled to rotate the first spreader disc 22 at a different speed than the second motor 30 rotates the second spreader disc 24 to spread the agricultural material in a desired distribution. Additionally, it may be desirable to spread the agricultural material away from obstructions (e.g., roadways, fences, irrigation canals, etc.) by lowering the speed of the spreader disc 20 closest to the obstruction. In some embodiments, it may be desirable to temporarily stop one spreader disc 20 to stop spreading agricultural material in a direction. Increasing the torque of the spreader discs 22, 24 may enable the spreader system 12 to readily spread denser agricultural material and/or greater quantities of agricultural material than spreader discs 22, 24 with less torque. Increased torque may enable the spreader disc 20 to eject large volumes and/or high mass flows of agricultural material. Adjusting the speed and the torque of the motors 26 during operation may enable the spreader system 12 to accommodate various consistencies of agricultural material without stalling. For example, high speeds may enable the spreader system 12 to spread the agricultural material further than low speeds. In addition, high torque may enable the spreader system 12 to spread dense and/or compacted agricultural material, such that the spreader system 12 may remain operational without stalling, and/or without stopping the harvester 10 to clear the spreader system 12.

In some embodiments, the motors 26 may be driven in a high torque mode or a low torque mode. As discussed in detail below, the torque of the first and second motors 28, 30 may be controlled between the high torque mode and low torque mode via a controlling a valve system to direct the working fluid 40 to the first and second motors 28, 30, or via controlling the displacement of each of the first and second motors 28, 30.

Figure 3:
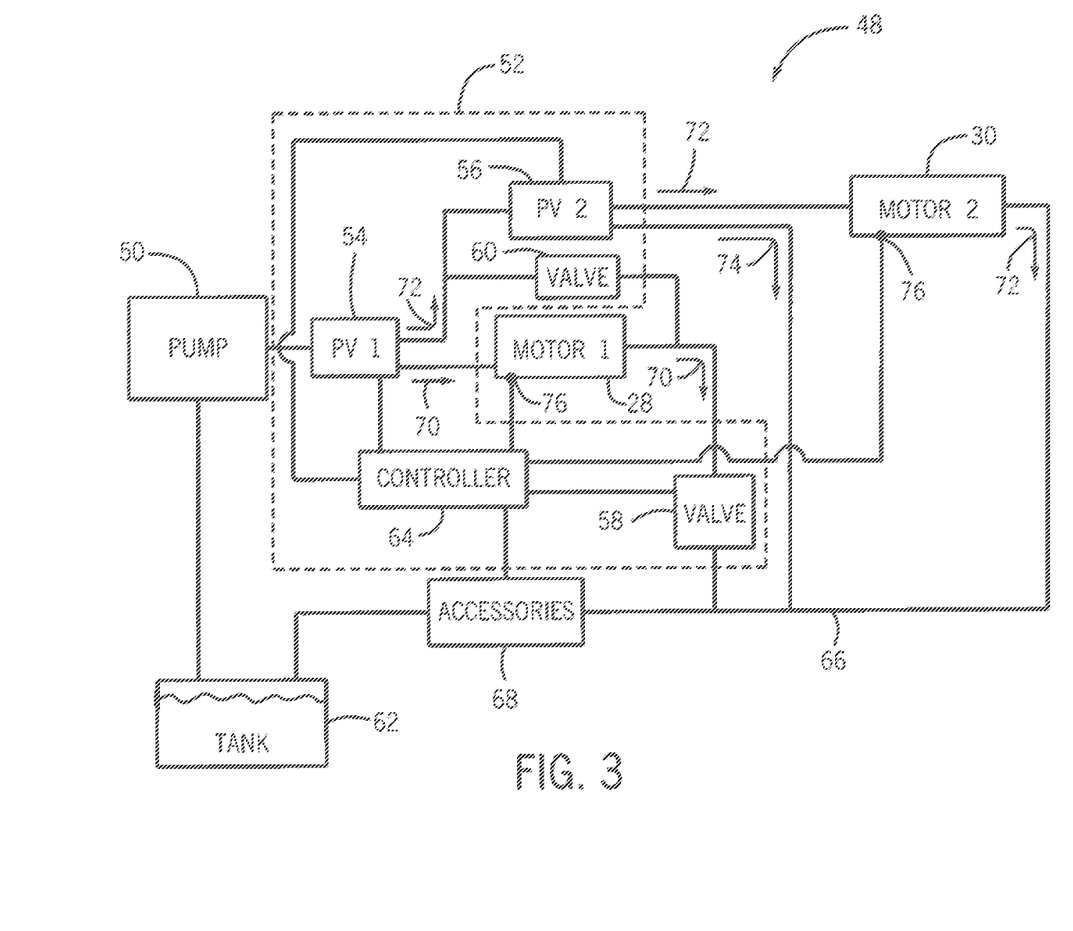
FIG. 3 is a schematic diagram of an embodiment of a hydraulic circuit that may be employed within the spreader system of FIG. 2.

FIG. 3 is a schematic diagram of an embodiment of a hydraulic circuit 48 with the first motor 28 and the second motor 30. The first and second motors 28, 30 receive the working fluid 40 from a single pump 50. A single pump 50 may reduce the complexity and cost of the spreader system 12. The first and second motors 28, are fluidly coupled to the pump 50 via a valve system 52. The valve system 52 includes a first proportional valve 54, a second proportional valve 56, and a blocking valve 58. In some embodiments, the valve system 52 may include a check valve 60. The first and second motors 28, 30 may be fluidly coupled in various arrangements, such as in a series flow arrangement and a parallel flow arrangement. In each arrangement, the pump 50 circulates the working fluid 40 through the valve system 52 and into a tank 62 (e.g., reservoir). A controller 64 controls the valve system 52 to control the working fluid 40 throughout the spreader system 12. In some embodiments, the first and second proportional valves 54, 56 are electro-proportional valves that are controlled by the controller 64. The controller 64 controls the first proportional valve 54 to direct a portion of the working fluid 40 to the first motor 28 and/or to the second proportional valve 54. The controller 64 controls the second proportional valve 56 to direct a portion of the working fluid 40 to the second motor 30 and/or to a tank line 66. In some embodiments, the working fluid 40 may also flow through one or more accessories 68 along the tank line 66. Accessories may include filters, fans, or other hydraulically powered accessories.

In the series flow arrangement, the working fluid 40 flows through the first proportional valve 54 to the first motor 28. The blocking valve 58 is in a closed position, thereby directing substantially all of the working fluid 40 to the second proportional valve 56 (e.g., via the check valve 60). The second proportional valve 56 directs substantially all of the working fluid 40 to the second motor 30. After flowing through the second motor 30, the working fluid 40 flows through accessories 68 of the harvester 10, and into the tank 62 to be recirculated by the pump 50. In some embodiments of the series flow arrangement, the controller 64 controls the first and second proportional valves 54, 56 to provide a pressure drop of the working fluid 40 across the first motor 28 to be approximately equal to a pressure drop of the working fluid 40 across the second motor 30. As the same volume of the working fluid 40 passes through the first motor 28 and the second motor 30 with approximately equal pressure drops in the series flow arrangement, the speed and torque of the first and second motors 28, 30 may be substantially equal (e.g., the first and second motors 28, are synchronized). As the first and second motors 28, 30 receive the full volume of the working fluid 40 from the pump 50, the first and second motors 28, 30 may rotate at a relatively high speed.

In the parallel flow arrangement, the proportional valve 54 divides the working fluid into a first portion 70 and a second portion 72. The first portion 70 flows through the first motor 28, and the second portion 72 flows through the second motor 30. The controller 64 opens the blocking valve 58 to enable the first portion 70 of the working fluid 40 to flow from the first motor 28 to the tank line 66. The second portion 72 of the working fluid 40 flows through the second proportional valve 56 to the second motor 30. Flow through the check valve 60 is blocked because the pressure of the second portion 72 of the working fluid 40 is greater than the pressure of the first portion 70 exiting the first motor 28. The second portion 72 of the working fluid 40 may then flow into the tank line 66 to be recirculated by the pump 50. By dividing the working fluid 40 into the first portion 70 and the second portion 72 at the first proportional valve 54, the first and second motors 28, 30 receive the working fluid 40 at the same relatively high pressure (e.g., pump pressure). In the parallel flow arrangement, the first and second motors 28, 30 are driven with a higher torque and lower speed than the first and second motors 28, 30 in the series flow arrangement. In some embodiments, the controller 64 adjusts the flow rates of the first and second portions 70, 72 to be approximately equal so that the torque and speed of the first and second motors 28, 30 may be substantially the same (e.g., synchronized). Thus, the series flow arrangement may enable the first and second discs 22, 24 to rotate at a relatively high speed, and the parallel flow arrangement may enable the first and second discs 22, 24 to rotate with a relatively high torque. Transitioning between the series flow arrangement and the parallel flow arrangement expands the range of speeds and the range of torques at which the first and second discs 22, 24 rotate. This enables the spreader system 12 to accommodate a larger range of flow rates of agricultural material without stalling.

The controller 64 controls the valve system 52 to direct the working fluid 40 through the first and second motors 28, 30 in the series flow arrangement or in the parallel flow arrangement. The controller 64 may control the valve system 52 to divide the working fluid 40 into the first portion 70, the second portion 72, and the third portion 74. The first portion 70 may be between 0 and 100 percent of the working fluid 40 from the pump 50, with the second portion 72 and the third portion 74 making up the remainder, if any, of the working fluid 40. The controller 64 is configured to control the first and second proportional valves 54, 56 to independently control the flow of the working fluid 40 to the first motor 28 and the second motor 30. For example, the controller 64 may instruct the first proportional valve 54 to direct ⅓ of the working fluid 40 to the first motor 28, and the second proportional valve 56 to direct ⅓ of the working fluid 40 to the second motor 30, and the remaining ⅓ of the working fluid 40 to the tank line 66. As another example, the controller 64 may instruct the first proportional valve 54 to direct ¼ of the working fluid 40 to the first motor 28 and the remaining ¾ of the working fluid 40 to the second motor 30. The controller 64 may control the flow of the working fluid 40 to the first and second motors 28, 30 to independently control the torque and speed of the motors 28, 30 regardless of the flow arrangement (e.g., series or parallel) of the valve system 52. For example, the controller 64 may instruct the valve system 52 to direct substantially all of the working fluid 40 through the first motor 28 in a series flow arrangement, approximately half of the working fluid 40 from the first motor 28 to the second motor 30, and the remaining half of the working fluid 40 to the tank line 66.

One or more sensors 76 may measure the speed and/or torque of the first and second motors 28, 30. In some embodiments, sensors 76 may measure the pressure of the working fluid 40 entering or exiting the first and second motors 28, 30. In some embodiments, sensors 76 may measure the flow of the agricultural material into the spreader system 12. The controller 64 may control the valve system 52 based at least in part on signals received from the sensors 76. For example, the controller 64 may control the valve system 52 to synchronize the first and second motors 28, 30 by adjusting the flow of working fluid 40 based at least in part on the detected speed of the first and second motors 28, 30. In some embodiments, the controller 64 may compare the torques of the first and second motors 28, 30 to a maximum torque (e.g., stall torque) when the valve system 52 is positioned in the series flow arrangement. The maximum torque may correspond to a maximum torque the working fluid 40 may provide in the series flow arrangement. In some embodiments, the maximum torque may be reached due to buildup of agricultural material in the spreader discs 20. When the torques of the first and second motors 28, 30 are greater than, or equal to, the maximum torque, the controller 64 may transition the valve system 52 to the parallel flow arrangement to increase the torque provided by the first and second motors 28, 30, thereby avoiding stalling the spreader system 12. When in the parallel flow arrangement, the controller 64 may compare the torques of the first and second motors 28, 30 to the threshold of the parallel flow arrangement. When the torques of the first and second motors 28, 30 are less than the maximum torque (e.g., stall torque) in the series flow arrangement, the controller 64 may transition the valve system 52 to the series flow arrangement to increase the speed of the first and second motors 28, 30.

The controller 64 may enable the harvester 10 to maintain a desired flow rate of agricultural material through the spreader system 12 by controlling the valve system 52 based at least in part on signals from the sensors 76. For example, the parallel flow arrangement with the higher maximum torque may enable larger quantities of agricultural material to flow through the spreader system 12 than the series flow arrangement. Some valves (e.g., first proportional valve 54, second proportional valve 54, blocking valve 58) of the valve system 52 may be hydraulically piloted valves that switch the valve system 52 between the series flow arrangement and the parallel flow arrangement. In some embodiments, hydraulically piloted valves may adjust the valve system 52 from the series flow arrangement to the parallel flow arrangement in response to a pressure spike or rise in pressure to reduce the system operating pressure. In some embodiments, the controller 64 may automatically switch the valve system 52 between the series flow arrangement and the parallel flow arrangement based on signals from the sensors 76. In some embodiments, an operator may manually direct the controller 64 to switch (e.g., transition) the valve system 52 between the series flow arrangement and the parallel flow arrangement.

Figure 4:
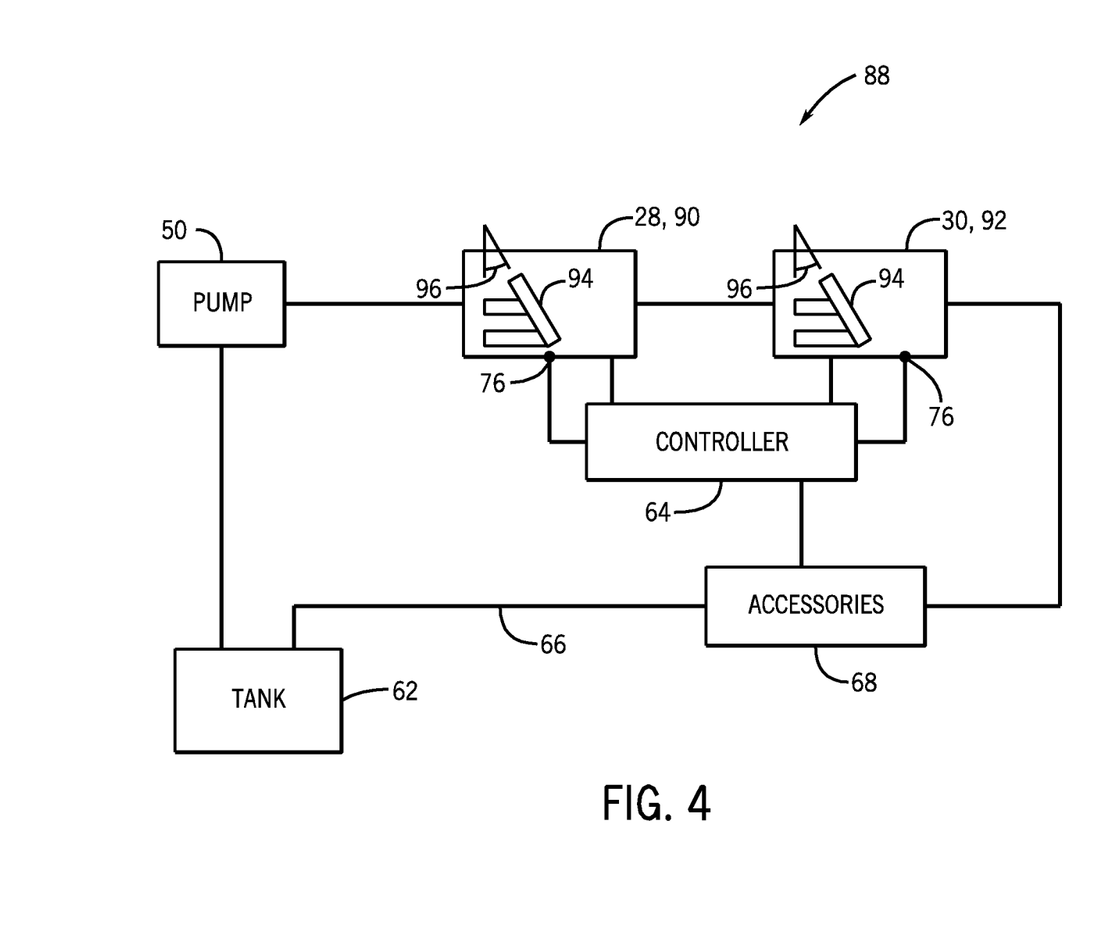
FIG. 4 is a schematic diagram of an alternative embodiment of a hydraulic circuit that may be employed within the spreader system of FIG. 2.

FIG. 4 is a schematic diagram of an alternative embodiment of a hydraulic circuit 88, in which the first and second motors 28, 30 are variable displacement motors 90, 92. The first variable displacement motor 90 is coupled in series with the second variable displacement motor 92. Each of the variable displacement motors may have a swash plate 94 that is adjustable to change the displacement of the motor, thus changing the torque and speed of the motor. In some embodiments, the first and second variable displacement motors 90, 92 may be two-speed displacement motors. Increasing the displacement may increase the torque while decreasing the speed, and decreasing the displacement may decrease the torque while increasing the speed. The controller 64 may control the angle 96 of the swash plate 94 to adjust the displacement of each motor. Similar to the embodiments discussed above with reference to FIG. 3, the controller 64 controls the torque and speed of the first and second variable displacement motors 90, 92 based at least in part on signals received from sensors 76 (e.g., signals indicative of torque, speed, and/or pressure of the working fluid). In some embodiments, the controller 64 may adjust the displacement of the first variable displacement motor 90 differently than the displacement of the second variable displacement motor 92. In this way, the controller 64 may independently control the torque and speed of the first and second variable displacement motors 90, 92. The controller 64 may also synchronize the adjustments to synchronize the torque and speed of the first and second variable displacement motors 90, 92. Synchronizing the first and second variable displacement motors 90, 92 may enable the agricultural material to be spread evenly across the field While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural spreader system, comprising:
    a first motor configured to be driven by a working fluid and to drive a first spreader disc in rotation;
    a second motor configured to be driven by the working fluid and to drive a second spreader disc in rotation; and
    a valve system comprising:
        a first proportional valve coupled to the first motor; and
        a second proportional valve coupled to the first proportional valve and to the second motor, wherein the valve system is configured to transition between a series flow arrangement and a parallel flow arrangement, the series flow arrangement is configured to direct the working fluid to the second proportional valve through the first proportional valve and the first motor, and the first proportional valve in the parallel flow arrangement is configured to direct a first portion of the working fluid to the first motor, and to direct a second portion of the working fluid to the second proportional valve, wherein the second proportional valve is configured to direct a fraction of the second portion of the working fluid to the second motor.

2. The system of claim 1, comprising a controller configured to instruct the valve system to transition between the series flow arrangement and the parallel flow arrangement.

3. The system of claim 2, wherein the controller comprises an input device configured to manually control the valve system.

4. The system of claim 2, comprising a torque sensor configured to output a signal to the controller indicative of a torque of the first motor or the second motor, wherein the controller is configured to instruct the valve system to transition between the series flow arrangement and the parallel flow arrangement based at least in part on the signal.

5. The system of claim 1, wherein the series flow arrangement of the valve system is configured to direct the working fluid to drive the first motor with a first torque and to drive the second motor with a second torque, the parallel flow arrangement of the valve system is configured to direct the working fluid to drive the first motor with a third torque and to drive the second motor with a fourth torque, the third torque is greater than the first torque, and the fourth torque is greater than the second torque.

6. The system of claim 1, wherein the first proportional valve comprises a first electro-proportional valve configured to divide the working fluid into the first portion and the second portion, and the second proportional valve comprises a second electro-proportional valve configured to divide the second portion into the fraction for the second motor and a remainder.

7. The system of claim 1, wherein the valve system is configured to control the first motor independently of the second motor.

8. The system of claim 1, wherein the valve system is configured to synchronize a first speed of the first motor with a second speed of the second motor.

9. The system of claim 1, wherein a first flow rate of the first portion of the working fluid is substantially equal to a second flow rate of the fraction of the second portion of the working fluid.

10. The system of claim 1, wherein the valve system comprises a check valve and a blocking valve, wherein the check valve is configured to direct the working fluid from the first motor to the second proportional valve in the series flow arrangement, the blocking valve is configured to direct the working fluid from the first motor to a tank line in the parallel flow arrangement, and the check valve is configured to prevent the working fluid from passing to the first motor from the second motor in the parallel flow arrangement.

11. An agricultural spreader system, comprising
a first hydraulic motor configured to drive a first spreader disc;
a second hydraulic motor configured to drive a second spreader disc;
a valve system comprising:
  a first proportional valve coupled to the first hydraulic motor; and
  a second proportional valve coupled to the first proportional valve and to the second hydraulic motor; and
a controller coupled to the first proportional valve and the second proportional valve, wherein the controller is configured to control the first proportional valve and the second proportional valve to independently control the first hydraulic motor and the second hydraulic motor, and the controller is configured to control a first torque of the first hydraulic motor and a second torque of the second hydraulic motor, wherein the controller is configured to control the first torque and the second torque to a low torque for normal operation, the controller is configured to control the first torque to a first high torque for clearing a material from the first spreader disc, and the controller is configured to control the second torque to a second high torque for clearing the material from the second spreader disc.

12. The system of claim 11, wherein the valve system is configured to transition between a series flow arrangement and a parallel flow arrangement, the series flow arrangement is configured to direct a first flow of a hydraulic fluid to the second proportional valve through the first proportional valve and the first hydraulic motor, the first proportional valve in the parallel flow arrangement is configured to divide the hydraulic fluid into the first flow and a second flow, the parallel flow arrangement is configured to direct the first flow to the first hydraulic motor, the parallel flow arrangement is configured to direct the second flow to the second proportional valve, and the second proportional valve is configured to direct a fraction of the second flow to the second hydraulic motor.

13. The system of claim 11, comprising a sensor configured to output a signal to the controller indicative of a speed of the first hydraulic motor, wherein the controller is configured to control the first torque of the first hydraulic motor based at least in part on the signal.

14. The system of claim 11, wherein the controller is configured to synchronize the first torque with the second torque.

15. The system of claim 1, wherein the first portion of the working fluid directed to the first motor is less than half of the working fluid received by the first proportional valve.

16. The system of claim 15, wherein the fraction of the second portion of the working fluid directed to the second motor is less than half of the working fluid received by the first proportional valve.

17. The system of claim 1, wherein the second proportional valve in the series arrangement is configured to divide the working fluid into a working portion and a remainder, wherein the second proportional valve is configured to direct the working portion of the working fluid to the second motor, and to direct the remainder to a tank line.

18. The system of claim 12, wherein the first flow directed to the first hydraulic motor in the parallel arrangement is less than half of the hydraulic fluid received by the first proportional valve, and the fraction of the second flow directed to the second hydraulic motor is less than half of the working fluid received by the first proportional valve.

19. The system of claim 12, wherein the second proportional valve in the series flow arrangement is configured to divide the first flow of the hydraulic fluid into a working portion and a remainder, wherein the second proportional valve is configured to direct the working portion of the hydraulic fluid to the second hydraulic motor, and to direct the remainder to a tank line.

20. The system of claim 11, wherein the first proportional valve comprises a first electro-proportional valve, and the second proportional valve comprises a second electro-proportional valve.

* * * * *